United States Patent Office.

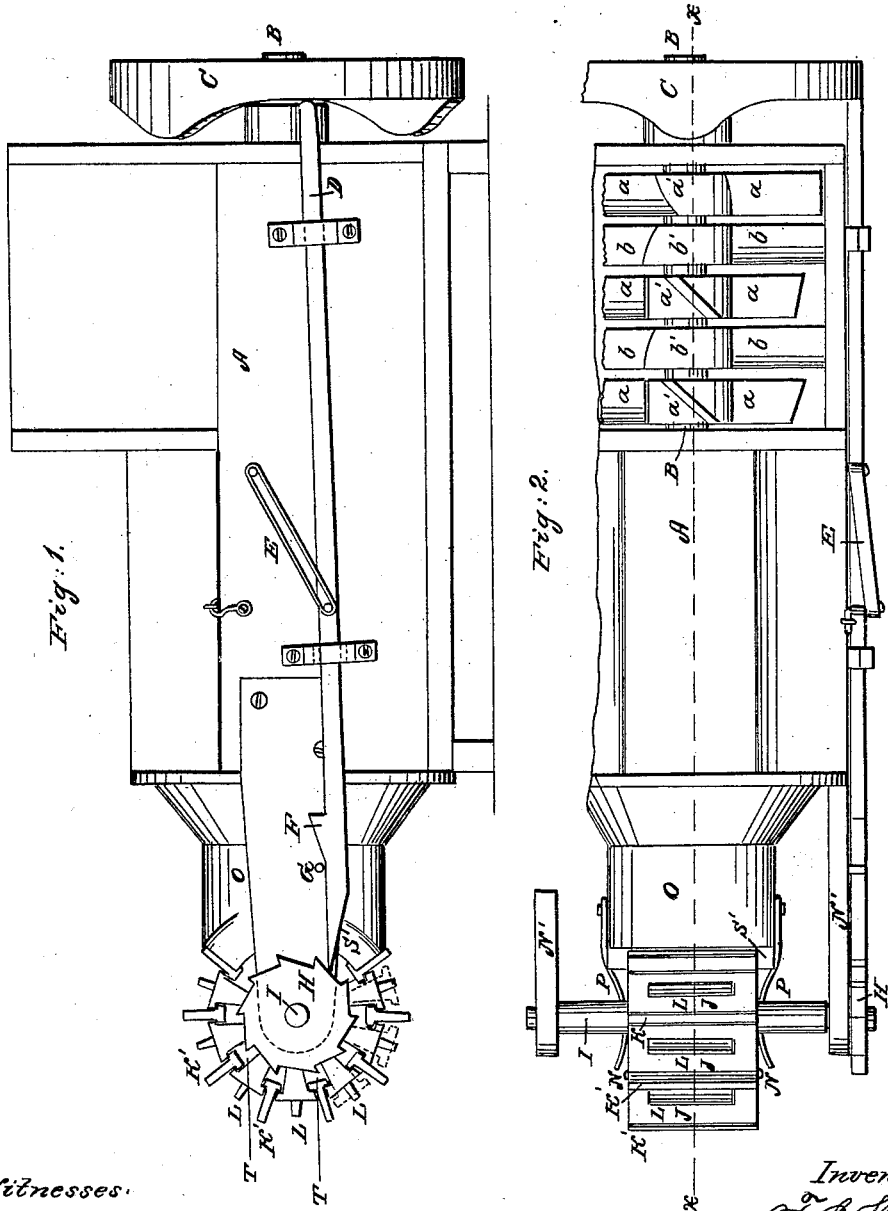

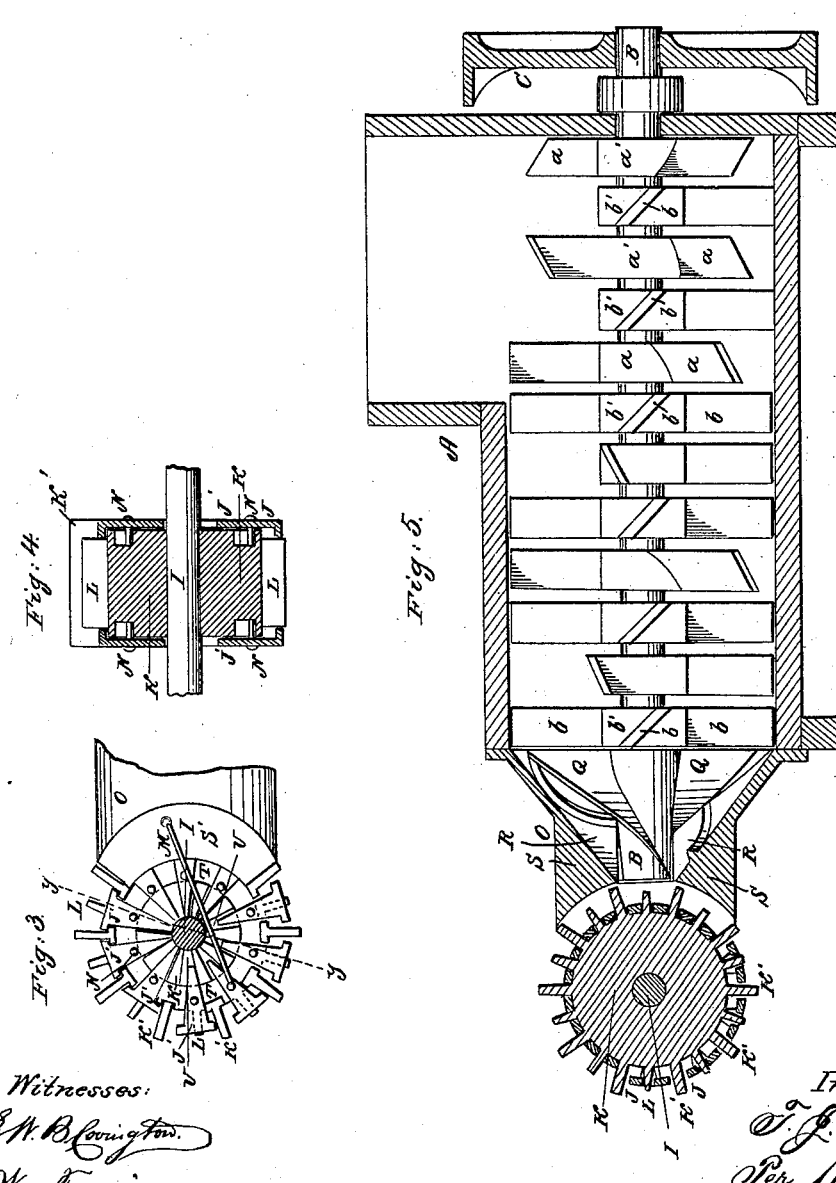

IMPROVED PEAT MACHINE.

THOMAS J. WELLS, OF NEW YORK.

Letters Patent No. 59,882, dated November 20, 1866.

SPECIFICATION.

TO ALL WHOM IT MAY CONCERN:

Be it known that I, THOMAS J. WELLS, of the city, county, and State of New York, have invented a new and useful improvement in Peat Machines; and I do hereby declare that the following is a full, clear, and exact description thereof, which will enable others skilled in the art to make and use the same, reference being had to the accompanying drawings forming part of this specification, in which—

Figure 1, sheet 1, is a side view of a machine made according to my invention.

Figure 2 is a plan.

Figure 3 is a detailed side view of the mould-wheel.

Figure 4 is a longitudinal section of said wheel in the plane of the line $y$ of fig. 3.

Figure 5, sheet 2, is a longitudinal section of the machine in the plane of the line $x$, fig. 2.

Similar letters of reference indicate like parts.

The object of this invention is to produce a simple and economical machine for breaking up, condensing, and preparing peat for fuel. The peat is passed through a box in which is placed a horizontal shaft, armed with knives that revolve with the shaft, intermediate of which revolving knives are fixed knives, which, like the others, extend radially from collars placed around the shaft. The blades of the revolving knives are diagonal to the axis about which they move, and their rotation is in such a direction as to push the peat towards the discharge end of the machine. The fixed knives are also set in diagonal planes with respect to the line of the shaft, but their inclinations are in the reverse direction to those of the revolving knives. The neck through which the peat is delivered to the moulds has conical sides on which are formed one or more spiral ridges or blades, whose course is about at a right angle with the course of spiral blades or wings, one or more, which are formed on that end of the shaft which extends into said neck. The peat is discharged from said neck into moulds formed on the periphery of a wheel which revolves in a vertical plane at the end of the neck. Said moulds have bottoms which are movable in radial directions within the sides of the moulds, and which, when those moulds that have been filled come under the axis of the wheel, are caused to drop or move outwards, pushing before it the block of peat, and allowing it to drop to the ground, or upon a travelling belt or platform. The letter A designates a frame within which a cutter shaft B revolves, the right-hand end of the frame being left open to receive the supplies of crude peat that are to be treated. The left-hand end of the frame terminates in a conical neck, whose discharge aperture is of the same, or about the same, dimensions as the area of the moulds in the mould-wheel hereinafter described. The cutter shaft is supported in a horizontal position in the frame, its left-hand end terminating at the end of the neck. The right-hand end of the shaft has on it, outside of the frame, a driving pulley C, on whose inner edge is formed a cam against which is held the end of the pawl D, which is moved forward at certain intervals by the cam against the teeth of a ratchet-wheel H, fixed on the shaft I of the mould-wheel. The pawl slides in staples or guides on the outside of frame A, and is held back against the cam by a spring E, which allows it to move both forwards and downwards, its downward motion being caused by the contact of the inclined plane, F, of the pawl with a pin G, that projects from the frame, the object of which downward motion is to prevent the pawl from binding on the ratchet. The staples or guides are made long enough to allow the pawl to have some vertical play in them. I do not wish to confine myself to the means here shown for operating the ratchet, since the same result can be effected by other well-known mechanical devices, and instead of a pawl I can use a shaft, with bevel gears, for turning the mould-wheel, and can give it either a continuous rotary motion or an interrupted or step by step movement. The cutter shaft B has fixed thereon a series of radial knives, $a$, set at an angle of about 45° with the shaft, said knives being in this example arranged on collars $a'$, fixed on the shaft, each collar being provided with four such knives. Between each set of knives $a$, that is to say, between their several collars, are placed rings or collars $b'$, which are attached to and supported by radial arms $b$, whose ends are permanently fastened to the frame A. These arms are arranged diagonally in planes at right angles to the revolving knives, and they form a series of fixed or stationary cutters, against whose edges the other cutters bear the peat, and thereby shear and reduce its mass into small divisions. The collars $b'$, of the stationary arms or knives, surround the shaft, but are of a larger diameter than it, so that the shaft revolves freely within them. Those collars $b'$, which are beneath the hopper, or open end of the frame of the machine, have only three arms, $b$, attached to them, to wit, one reaching to the bottom of the frame, and two lateral arms; but those collars $b'$, which are in the closed part of the frame have four arms, two lateral, and one above and one below, each fastened to the frame. The last collar $b'$ is placed at the end of the body of the frame next to the widest part of the neck O, and that part of the shaft B which is contained within said neck has two spiral blades, Q, on sides opposite to each other, which are made narrow, as they approach the end of the shaft, so as to conform to the shape of the conical neck within which they revolve. These blades terminate at or near the end of the shaft, and form propellers or conveyers that propel the peat, after it has been broken up and reduced to a homogeneous and plastic mass by the knives, into the moulds of the mould-wheel. For the purpose of facilitating the conveyance of the peat through the neck I have formed three spiral blades or ridges, R, in the neck, at equal distances from each other, on courses at right angles to the courses of the propeller blades Q, so that the mass of peat acted on by the blades Q will be pushed forward against the blades or ridges R, which will act as guides to direct it forward, and will prevent it from remaining stationary in the neck, or from being retarded by sticking to and merely rotating with the shaft, the mass of peat being forced against the ridges R, whose spiral course will resist the rotation of the peat in the same circle, and will direct it forward toward the end of the shaft, about which it passes in going out into the moulds. The discharge, opening at the end of the neck, is of the same form and dimensions as the area of the outer part of the moulds, and is surrounded by a rim within which the moulds of the mould-wheel pass, the side pieces $s'$ of said rim projecting far enough towards the centre of the wheel to cover the ends of the moulds, and the upper and lower parts, S, thereof being curved concentrically with the mould-wheel K, as is seen in fig. 5. The mould-wheel has arms K', which radiate from the periphery of its solid part, extending the whole length of the wheel, and forming the sides of the moulds. Between them are radial dies L, which are both shorter and narrower than the arms K', and pass through slots made in the movable bottoms J of the moulds. These movable bottoms rest on the solid periphery of the wheel K, when its revolution carries them over its centre, the distance apart of the radial arms K', at the periphery of the solid part of the wheel, being such as to allow the movable bottoms to fit between them with a close enough joint to prevent the peat from getting under the bottoms, and thereby prevent them from coming down snugly to their places. In order to prevent the said bottoms from being obstructed in their movements, or from being clogged by the presence of peat below or behind them, provision may be made to remove it by making the wheel K hollow, so that as fast as any peat makes its way behind or beneath the bottoms J, it will be forced into the hollow space within the wheel, the openings into which may be closed by valves opening only inwards, and preventing the return of the peat. In case such an arrangement is made to receive the peat within the wheel K, it will be necessary to make an opening near its periphery to let the peat escape continually, by gravity, during the revolution of the wheel, or it may be removed after the wheel has become nearly full. I have not shown any such arrangement for collecting and removing peat which may run behind or below the movable bottoms, but have shown a solid wheel, from whose periphery beneath the movable bottoms the peat, which is exceedingly plastic, after going through the reducing and condensing cutters, will be free to run off as fast as it is collected. The ends of wheel K have radial grooves, U, cut in them, which intersect an annular groove T, made in each end of the wheel. The radial grooves serve as guides for the arms J', which extend from the ends of the movable bottoms towards the centre of the wheel, each arm being provided with a pin, N, which projects from both the inside and outside surfaces of the arms, the part which projects from the inside surface playing in the annular groove T, the outer side of which arrests it, and thereby limits the extent of the centrifugal motion of the movable bottoms to whose arm it belongs. Those parts of the pins N which are outside of the arms J', are acted on by eccentrics or wipers P P, that extend alongside the ends of the wheel in such a position that the pins will come in contact with said wipers at the time when the moulds are below the centre of the wheel, directly after they have been filled with peat. The wipers are made stiff enough to crowd the movable bottoms of the moulds towards the circumference of the wheel in case the gravity of the moulds, after they are filled, does not suffice to make them fall down while they are passing below the centre of the wheel. The sides, K', of the moulds are flaring because they are in radial lines, and it is only necessary to start the blocks of peat which will have been pressed into them from the neck O in order to cause their free discharge while the moulds are in their lowest position. When the moulds rise above the centre of the wheel gravity will cause their false bottoms to resume their places on the wheel ready to receive fresh supplies of peat as they pass the neck O. Each movable or false bottom has a slot through its centre to receive a radial die, L, which when the peat is forced into the mould is covered thereby, making a cavity in the peat block, when the block is afterwards shoved off the die L by the falling of the movable bottom. The cavity in the block will be a continuous one, because the die is a continuous piece, the depth of the cavity being determined by the width of the die; but instead of being in one unbroken piece, the said die may be composed of several projections or points, or it may have a pointed or irregular edge, the use of the cavity being to facilitate the drying of the block of peat by increasing the surface from which evaporation may take place. In order to ensure the return of the movable bottoms to the lower parts of the moulds before they are brought opposite to the end of the neck O, wipers may be employed like those provided to force them outwards to discharge the blocks of the peat. In order to prevent the entrance of the peat below or behind the movable bottoms their edges may have flexible strips of leather or rubber or other material, to protect and cover the joints between the said bottoms J and the side pieces K'. It will be observed that owing to the construction of the rim of the neck O, the outer surfaces of the blocks of peat will be in the form of a curve, which curve will be an arc of the circle described by the edges of the arms K', the end of the neck and the edges of its rim being formed with a concentric curve, as is shown in fig. 5. By means of this construction I am able to drive the mould-wheel continuously without stopping it as each mould comes opposite the discharging orifice in the neck.

What I claim as new, and desire to secure by Letters Patent, is—

1. The combination of the fixed and rotating diagonal arms or knives *a b*, when placed within a horizontal frame, with spiral propelling blades Q, substantially as described.

2. I also claim making spiral blades, or ridges, one or more, in the inside of the discharge neck O, in direction the converse of the directions of the spiral propelling blades Q, substantially as described.

3. I also claim a stationary die L, one or more, projecting through the movable bottom of the mould, substantially as described.

THOS. J. WELLS.

Witnesses:
ALEX. F. ROBERTS,
J. M. COVINGTON.